United States Patent [19]

Funk

[11] 4,415,296
[45] Nov. 15, 1983

[54] MATERIALS TRANSFER SYSTEM AND METHODOLOGY

[75] Inventor: Erwin D. Funk, Glens Falls, N.Y.

[73] Assignee: Kamyr, Inc., Glens Falls, N.Y.

[21] Appl. No.: 302,081

[22] Filed: Sep. 14, 1981

[51] Int. Cl.³ .............................................. B65G 53/66
[52] U.S. Cl. ...................................... 406/19; 406/12; 406/63; 406/105; 406/106
[58] Field of Search ...................... 406/10, 12, 19, 62, 406/63, 105, 106, 197

[56] References Cited

U.S. PATENT DOCUMENTS

| | | | |
|---|---|---|---|
| 3,400,984 | 9/1968 | Shellene et al. | 406/12 |
| 3,950,146 | 4/1976 | Funk . | |
| 3,950,147 | 4/1976 | Funk . | |
| 3,982,789 | 9/1976 | Funk . | |
| 4,073,629 | 2/1978 | Funk . | |
| 4,082,368 | 4/1978 | Funk . | |

FOREIGN PATENT DOCUMENTS

| | | |
|---|---|---|
| 128264 | 3/1950 | Sweden . |
| 2061393 | 5/1981 | United Kingdom . |

*Primary Examiner*—Jeffrey V. Nase
*Attorney, Agent, or Firm*—Cushman, Darby & Cushman

[57] ABSTRACT

A method and system are provided for continuously conveying hard particulate material of non-uniform size, like coal. A high pressure transfer device has high and low pressure feed and discharge lines extending to and from it, and a screen arrangement for allowing liquid and fines to pass from the low pressure feed line to the low pressure discharge line, while stopping large particles. An excess accumulation of fines is prevented by providing a screen assembly vertically above the high pressure transfer device. Level control in a hopper—which provides the low pressure feed line—is accomplished merely utilizing an overflow technique. The concentration of particles in the liquid in the high pressure discharge line is maintained about 50% by withdrawing a portion of the liquid (while still under pressure) from the high pressure discharge line, and returning it to the high pressure feed line. A density measuring device downstream of the liquid withdrawal automatically controls the amount of liquid withdrawal.

25 Claims, 5 Drawing Figures

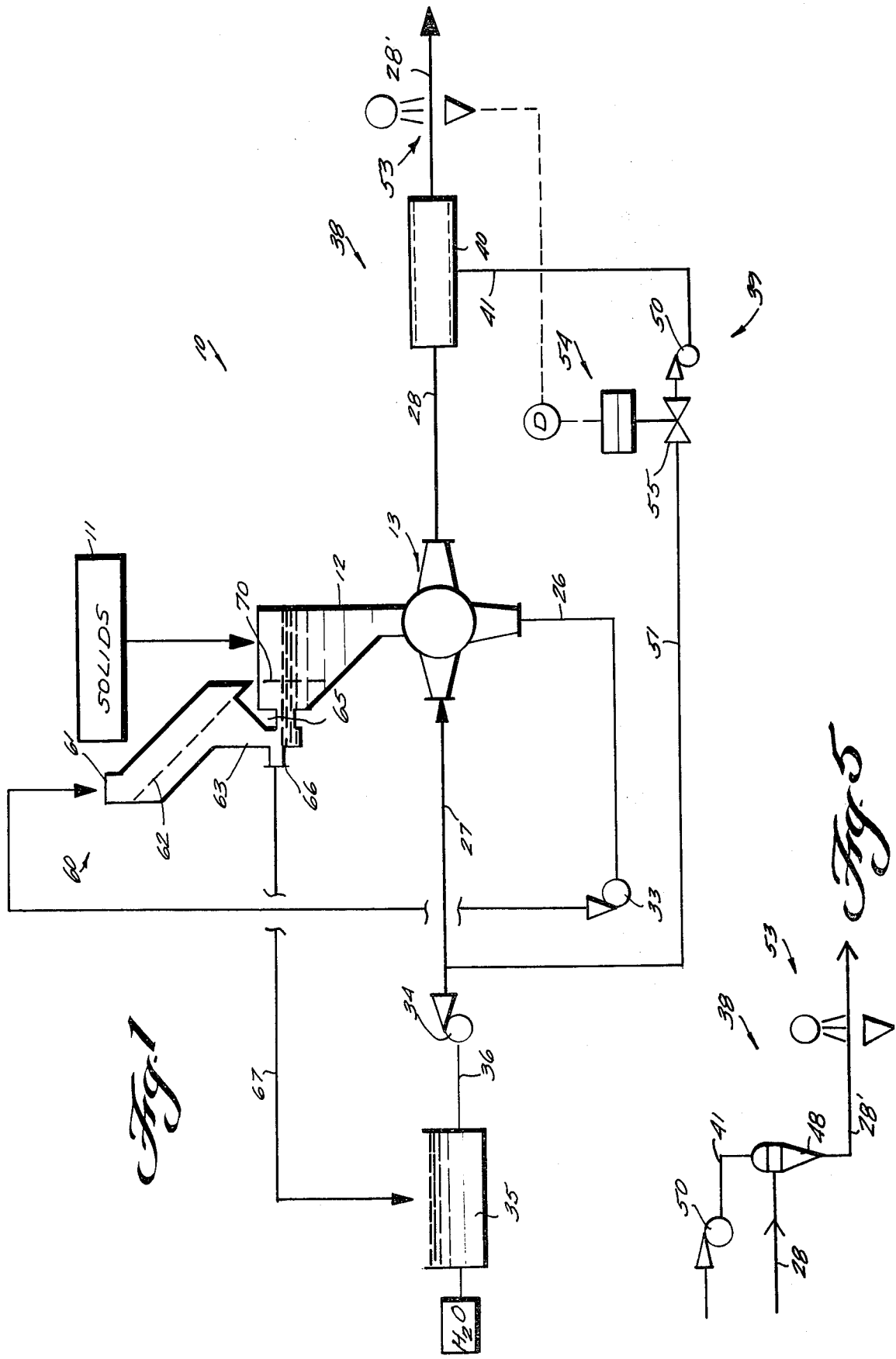

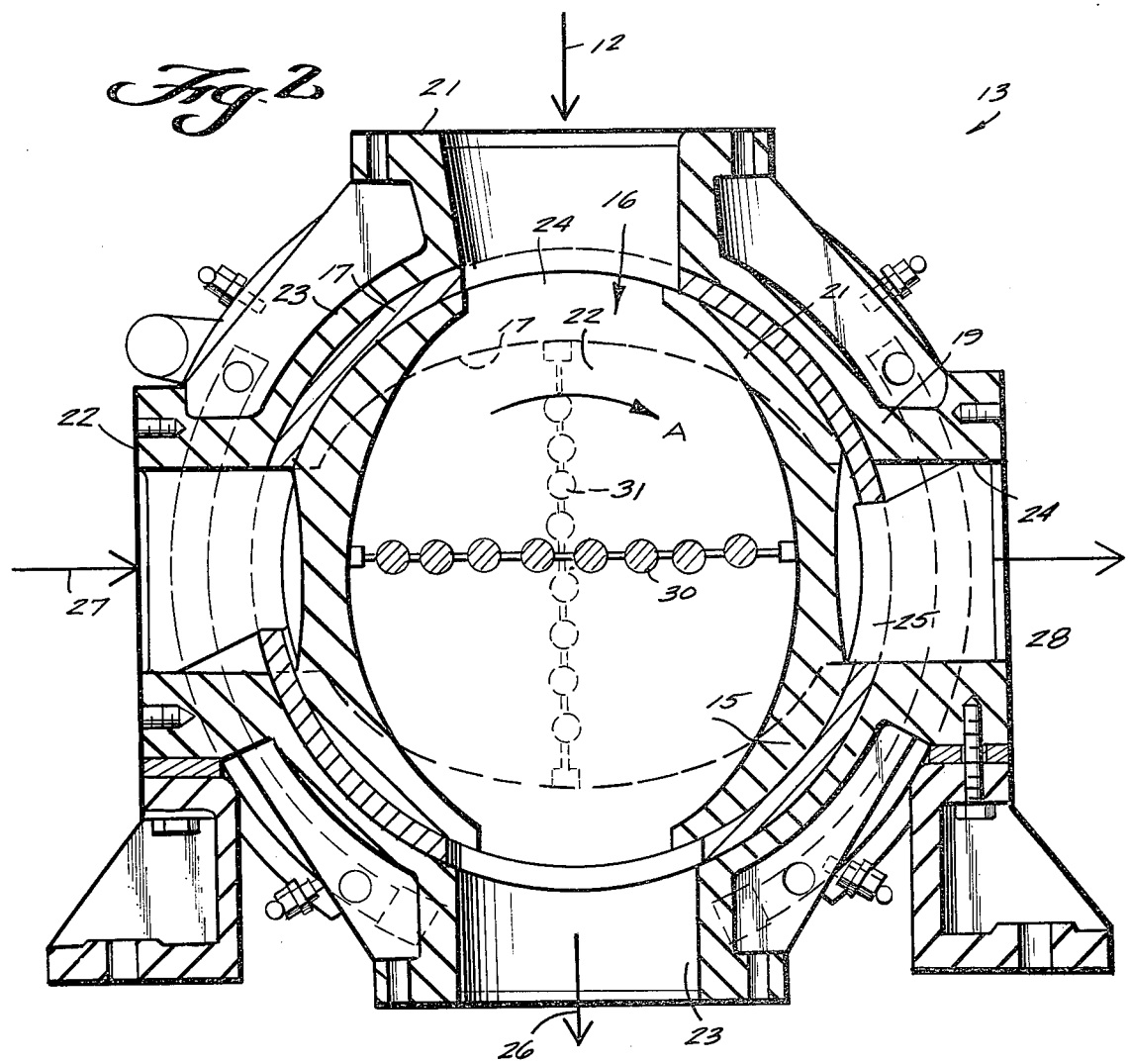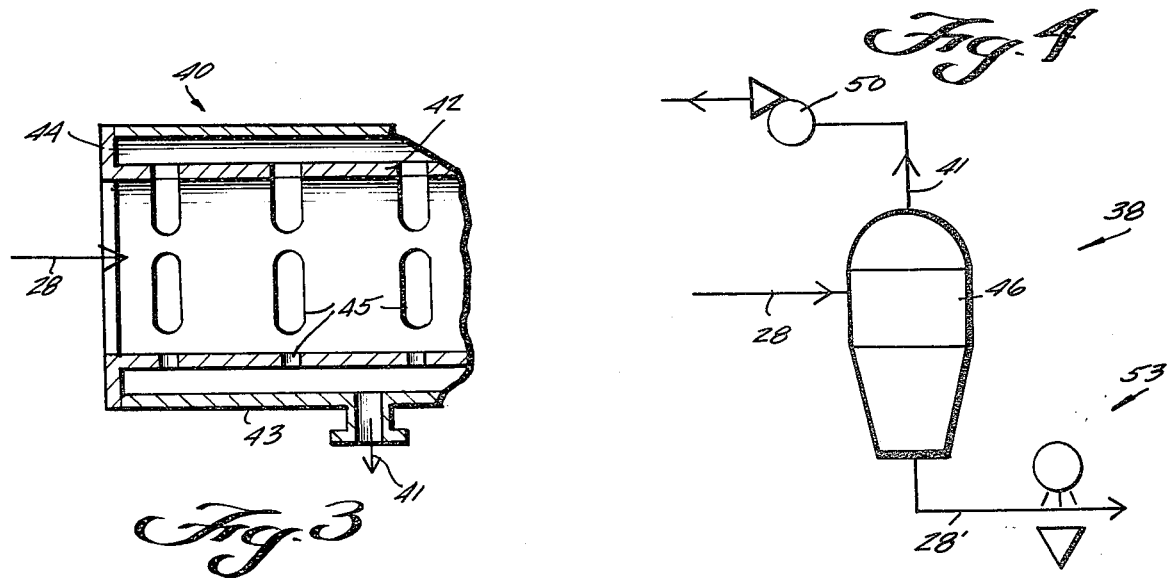

MATERIALS TRANSFER SYSTEM AND METHODOLOGY

BACKGROUND AND SUMMARY OF THE INVENTION

In the mining of coal, oil shale, ore, or the like, particularly from underground mines, a high pressure transfer device is desirably used to facilitate conveyance of the particulate material from the mine site to a transportation utilization area. This is commonly provided, such as shown in U.S. Pat. Nos. 3,982,789 and 4,082,368, by feeding the particulates into a hopper connected to the high pressure transfer device, screening large particles out of a particle-liquid slurry passing into the high pressure transfer device while withdrawing liquid and fine particles from the device through a low pressure discharge line, and conveying the particles out of the high pressure transfer device by the introduction of liquid under high pressure into the transfer device, the liquid and entrained particles under high pressure exiting the device through a high pressure discharge line and passing to the utlimate destination.

Prior apparatus and procedures for transporting particulates in the manner described above have been successful, however under some circumstances there is a tendency for so much water to pass through the transfer device into the high pressure discharge line that the concentration of solids in the high pressure discharge line is lower than desired for ultimate utilization of the particles in the slurry. For instance, the concentration of particles in water in the low pressure feed line is generally about 50%, but the concentration in the high pressure discharge line can be as low as 25-30%, a concentration of about 45% or more (e.g., 50%) being desirable. The introduction of excess water into the high pressure device from the high pressure feed line results since it is necessary to ensure forceful washing of all the particles out of the high pressure transfer device, and since pathways can be established during rotation of the rotor of the high pressure transfer device that provide a much lower resistance to liquid flow than the particle-filled pocket into which liquid passage is desired.

According to the present invention, a method and apparatus are provided for continuously conveying particulate material that recognizes the concentration reductions that can occur in the high pressure discharge line, and corrects them. According to the present invention, a portion of the liquid in the high pressure discharge line is withdrawn (while under high pressure) to increase the solids concentration in the high pressure discharge line to the value desired. Withdrawal can be accomplished utilizing an in-line screen having a plurality of peripheral openings, a settling tank, or a hydrocyclone. The withdrawn liquid is returned to the pressure feed line between the high pressure pump and transfer device, and the pressure of the returned liquid is boosted (by a pump or the like) so that it corresponds generally to the pressure of the liquid in the high pressure feed line. A solids concentration measuring device, such as a gamma radiation absorption device, measures solids concentration. The measurements obtained are used to automatically control the amount of withdrawn liquid so that the concentration in the high pressure discharge line is at the desired level.

Conventional systems and methods for conveyance of particulate material also can have pump damage and other problems as a result of build-up of fines in the low pressure lines. This can particularly become a problem when a center screen is used in the high pressure transfer device in order to prevent damage to the transfer device rotor and/or housing. Utilization of such a center screen is disclosed in copending application Ser. No. 123,947, filed Feb. 25, 1980. According to the present invention, fines removal is accomplished by pumping the liquid and fines in the low pressure discharge line to a screen assembly located vertically above the high pressure transfer device and feed hopper, and then allowing the screened liquid to pass by gravity flow into the hopper.

An arrangement such as described above for fines removal also facilitates control of the level in the hopper in a simplified manner. Typically, level control—which is necessary—is accomplished utilizing a sensor which controls a valve disposed in the low pressure discharge line, or a line for feeding liquid into the hopper. According to the invention, the necessity for such a sensing device and associated valve is eliminated, providing a much simpler form of level control. According to the invention, an overflow is provided from an area of the hopper near (but spaced from) its top, this area communicating with the gravity flow from the screening assembly. A stepped arrangement of horizontal pipes is provided. Further, in order to prevent contamination of the overflow line if an upset condition should occur (since the overflow is desirably connected to the sourceof liquid for the high pressure feed line), a vertically extending screen is provided in the hopper adjacent the overflow.

It is the primary object of the present invention to provide a method and apparatus facilitating the efficient conveyance of hard particulate material of non-uniform size. This and other objects of the invention will become clear from an inspection of the detailed description of the invention, and from the appended claims.

BRIEF DESCRIPTION OF THE DRAWINGS

FIG. 1 is a schematic view of an exemplary system according to the present invention for the continuous conveyance of coal or the like;

FIG. 2 is a cross-sectional view of an exemplary high pressure transfer device utilizable in the system according to the present invention;

FIG. 3 is a side cross-sectional view of a portion of the high pressure discharge line in-line screen illustrated in FIG. 1; and FIGS. 4 and 5 are schematic views illustrating alternative structures for removing liquid from the high pressure discharge line in the system of FIG. 1.

DETAILED DESCRIPTION OF THE DRAWINGS

Exemplary apparatus according to the present invention, for practicing methods of continuously conveying hard particulate material according to the present invention, is shown generally at 10 in FIG. 1. The apparatus 10 includes a source 11 of a slurry of hard particulate material of non-uniform size, such as coal, ore, oil shale, or the like. Particles from source 11 are discharged into hopper 12, which comprises a low pressure feed line for a high pressure transfer device 13. The high pressure transfer device 13 is of conventional design, being of the type such as shown in U.S. Pat. No. 4,073,629 and pending U.S. application Ser. No. 123,947, filed Feb. 25, 1980.

An exemplary high pressure transfer device 13 is illustrated more clearly in FIG. 2 and comprises a rotor 15 containing two or more diametrically through-going pockets 16, 17. Where two pockets are provided they are perpendicular to each other. Preferably two sets of perpendicular pockets are provided. The rotor 15 is mounted in a housing 19, and rotates within the housing 19, preferably about a vertical axis, and in the direction A illustrated in FIG. 2. Any suitable power source for effecting rotation may be utilized. The housing includes first, second, third, and fourth ports 21, 22, 23, and 24, respectively, equally spaced around the periphery of the housing 19 for registry with inlets and outlets to and from the pockets 16, 17. First port 21 is connected up to the low pressure inlet line 12 to the device 13, and the third port 23 (opposite first port 21) is connected to the low pressure discharge line 26 from device 13. Second port 22, between ports 21 and 23, is connected to the high pressure feed line 27, while fourth port 24 (opposite second port 22) is connected to the high pressure discharge line 28.

The transfer device 13 also includes at least one screen associated therewith for allowing passage of liquid and fine particles therethrough, but preventing particles larger than a predetermined size from passing therethrough. The screen may be a fixed "bottom" screen, or may comprise a plurality of "center" screens, one located in each pocket 16, 17, etc. In the embodiment actually illustrated in FIG. 2, the at least one screen is shown as a plurality of center screens 30, 31 located in pockets 16, 17, respectively.

Disposed in the low pressure line 26 is a low pressure pump 33 which circulates liquid and fines from transfer device 13 ultimately back to hopper 12. A high pressure pump 34 is connected to the high pressure feed line 27, and a source of liquid which is pressurized by the pump 34 may be a tank, pond or like source 35, connected by pipe 36 to pump 34.

The structure heretofore described is basically conventional. According to the present invention, other apparatus is utilized for facilitating conveyance of hard particulate material by the transfer device 13 and associated components.

According to one aspect of the present invention, the concentration of solids in the high pressure discharge line 28 is controlled so that it is at the desired level. Typically, after discharge from the high pressure transfer device 13, the solids concentration in line 28 will be on the order of 25–30%, while greater than about 45% (e.g., 50%) is desired. In order to effect concentration to the desired level in a simple and easy manner, means 38 are provided for withdrawing a portion of the liquid in line 28 (while still under high pressure), and a means 39 is provided for returning liquid withdrawn from the line 28 to the line 27 (between high pressure pump 34 and transfer device 13). In the embodiment illustrated in FIG. 1, the withdrawal means 38 includes an in-line screen 40, with an outlet line 41 from it.

Details of an exemplary screen 40 are illustrated more clearly in FIG. 3. The screen 40 preferably comprises an inner tube 42 connected directly to the line 28, and surrounded by an outer tube 43, end plates (e.g., plate 44 in FIG. 3) sealing the circumferential volume between the tubes 42, 43. The inner tube 42 has a plurality of slots formed therein, preferably peripherally extending slots 45 as illustrated in FIG. 3. The slots are large enough so that liquid and fine particles can pass therethrough, but small enough so that the bulk of the particulate material being conveyed will not pass therethrough.

FIGS. 4 and 5 illustrate alternative forms of apparatus 38 for withdrawing a portion of the liquid from line 28. In FIG. 4, the means 38 comprises a settling tank 46, while in FIG. 5 the means 38 comprises a hydrocyclone 48.

The means 39 for returning the withdrawn liquid to the high pressure feed line 27 preferably comprises a boosting pump 50 for boosting the pressure of the withdrawn liquid so that it approximately corresponds to the pressure in line 27 (overcoming any line losses there may be), and a pipe 51 leading from pump 50 to line 27.

In order to maintain the concentration of the particles in the discharge line portion 28' (downstream of the liquid withdrawal means 38), automatic means for measuring the solids concentration and controlling the liquid withdrawal by means 38, 39, preferably are provided. Such automatic control means preferably comprises a gamma radiation absorption device 53 disposed in the portion of the high pressure discharge line, 28', downstream of the liquid withdrawal means 38. The device 53 measures the solids concentration of the slurry in 28', and transmits that information to a control mechanism 54 for a valve 55 disposed in line 51. The control 54 throttles the valve 55 to the extent necessary to ensure withdrawal of the appropriate amount of liquid through line 41 so that the concentration in 28' is at a desired level (e.g., 50%).

The low pressure line inlet for the device 13 preferably comprises the hopper 12, solids from source 11 being dumped into the hopper 12. Fines are allowed to pass into the low pressure line 26, but when the accumulation of fines becomes a problem (which can occur when center screens 30, 31 are utilized with the high pressure transfer device 13), it is desirable to remove the fines. This desirably is accomplished utilizing a low pressure screen assembly 60 located vertically above the device 13, and hopper 12. Liquid and fines in line 33 are pumped by pump 33 to the top of the assembly 60, entering inlet 61 thereof. A slanting fine mesh screen 62 is disposed in the device 60 between the inlet 61 and outlet 63 thereof. For instance, the screen 62 may have 0.25 mm openings therein. Liquid passes through the screen 62 and enters the hopper 12.

The provision of the screen assembly 60 vertically above the hopper 12 facilitates a simplified manner of controlling the level of liquid in hopper 12. Instead of using a conventional sensor and control valve, level control is provided merely by disposing a pair of stepped overflow pipes 65, 66 adjacent (but spaced from) the top of hopper 12. Liquid passing through outlet 63 from screen assembly 60 passes through pipe 65 into hopper 12, and relatively open fluid communication is achieved therebetween. However should the level in hopper 12 rise too much, the liquid will overflow into pipe 66, ultimately passing from line 67 to tank 35.

In order to prevent tank 35 from being contaminated with particles should an "upset" condition occur in the hopper 12, a vertically extending screen 70 is provided in the hopper 12. The screen 70 is disposed between pipes 65, 66 and the area of the hopper into which particulate material is fed, so that any liquid flowing through pipes 65, 66 from hopper 12 must pass through the screen 70. The screen 70 allows free passage of liquid, and even fines therethrough, having relatively large openings (e.g., 6 mm openings), but is effective to prevent the passage of large particles into the tank 35.

In the practice of a method of continuously conveying hard particulate material according to the present invention, liquid containing a particulate material is fed under low pressure from hopper 12 into port 21 of transfer device 13. The rotor 15 is rotated in direction A so that the pocket openings therein progressively rotate past each of the housing ports. Low pressure withdrawal of liquid introduced through first port 21 from the through-going pockets (16, 17) of the rotor is provided through third port 23 into the low pressure discharge line 26. At this time, particulate material above a predetermined size is screened out of the liquid passing through the third port by the screens 30, 31, or a "bottom" screen. Liquid under high pressure is pumped by a pump 34 from high pressure line 27 into second port 22, and high pressure liquid is withdrawn from port 24 through discharge line 28. Some of the liquid in line 28 is withdrawn by means 38 through line 41, its pressure is boosted by pump 50, and it is introduced back into the high pressure feed line 27. The density of the slurry in line portion 28'—downstream of the liquid withdrawal means 38—is automatically measured by device 53, and those readings are used to automatically control the extent to which the valve 55 is opened, thereby controlling the amount of liquid withdrawn through means 38, and therefore the density of the slurry in conduit portion 28'.

Liquid and fines withdrawn through line 26 are pumped by pump 33 to the inlet 61 for screen assembly 60, and the fines are screened out by screen 62. The liquid then passes through outlet 63 and pipe 65 into hopper 12. Should the level of liquid in hopper 12 rise too much, it overflows through pipes 65, 66, ultimately returning to the tank 35. Should an "upset" condition occur in the hopper 12, the vertical screen 70 will prevent the passage of large particulates into overflow line 67.

It will thus be seen that according to the present invention a simple and efficient method of continuously conveying hard particulate material has been provided.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of continuously conveying hard particulate material of non-uniform size, such as coal, utilizing a high pressure device including a pocketed rotor containing a pair of diametrically through-going pockets perpendicular to each other, a housing enclosing the rotor and having four ports equally spaced around the periphery thereof for registry with inlets and outlets to and from the through-going pockets in the rotor, at least one screen associated with the housing and rotor for allowing passage of liquid and fine particles therethrough, but preventing passage of particles larger than a predetermined size therethrough, and high and low pressure feed lines and discharge lines leading to and from the rotor ports; the method comprising the steps of
(a) continuously feeding liquid, containing the hard particulate material, under low pressure in a low pressure feed line into a first of the housing ports for entry into a through-going pocket of the rotor;
(b) rotating the rotor in a given direction of rotation, so that the pocket openings therein progressively rotate past each of the housing ports;
(c) providing low pressure withdrawal of liquid introduced through the first port from through-going pockets of the rotor through a third port of the housing into a low pressure discharge line, opposite the first port, and screening the particulate material above a predetermined size out of the liquid passing through the third port with the at least one screen;
(d) pumping liquid under high pressure in a high pressure feed line toward the rotor through a fourth port of the housing, the fourth port being located before the first port in the direction of rotation of the rotor, and between the first and third ports;
(e) providing withdrawal of liquid and material through a second port, located opposite the fourth port, into a high pressure discharge line;
(f) withdrawing a portion of the liquid, while under high pressure, from the high pressure discharge line to increase the solids concentration in the high pressure discharge line; and
(g) returning liquid withdrawn in step (f) to the high pressure feed line, boosting the pressure thereof so that it corresponds generally to the pressure of the liquid in the high pressure feed line.

2. A method as recited in claim 1 wherein the solids concentration in the high pressure discharge line is about 25–30%, and wherein step (f) is practiced to increase the solids concentration to greater than about 45%.

3. A method as recited in claims 1 or 2 comprising the further steps of: automatically measuring the solids concentration of the liquid in the high pressure discharge line after the practice of step (f); and automatically controlling the liquid amount withdrawn in step (f) in response to the solids concentration measurement to provide the desired solids concentration in the high pressure discharge line.

4. A method as recited in claim 3 wherein step (f) is practiced by in-line screening of liquid in the high pressure discharge line.

5. A method as recited in claim 3 wherein step (f) is practiced by providing a hydrocyclone in the high pressure discharge line.

6. A method as recited in claim 3 wherein step (f) is practiced by providing a settling tank in the high pressure discharge line.

7. A method as recited in claim 1 wherein step (f) is practiced by in-line screening of liquid in the high pressure discharge line.

8. A method as recited in claim 1 comprising the further steps of: (h) removing, under low pressure, fine particles from the low pressure discharge line; and (i) returning liquid, after fine particles removal, to the low pressure feed line.

9. A method as recited in claim 8 wherein step (h) is accomplished by screening at an area located vertically above the high pressure transfer device, and wherein step (i) is practiced by providing gravity flow from the screening area to the low pressure feed line.

10. A method as recited in claim 9 wherein the low pressure feed line comprises a hopper, gravity flow from the screening area being provided into the hopper; and wherein the method comprises the further step of:
(j) controlling the level of liquid in the hopper by providing for overflow from an upper portion of the hopper, below the top of the hopper.

11. A method as recited in claim 10 wherein step (j) is practiced by providing the overflow portion of the hopper at the general area where the gravity flow from the screening area enters the hopper, and just above the entry area.

12. A method as recited in claim 11 comprising the further step of preventing contamination of the overflow line should an upset occur in the hopper by providing a substantially vertically extending screen in the hopper between the overflow line and an area of the hopper into which particulate material is fed, the vertical screen allowing passage of liquid and fine particles therethrough, but preventing passage of particles larger than a predetermined size therethrough.

13. A method as recited in claims 1 or 8 wherein the at least one screen comprises a mid-screen disposed in a central portion of each of the rotor pockets.

14. Apparatus for conveying hard particulate material of non-uniform size, comprising:
a high pressure transfer device comprising: a rotor containing a pair of diametrically through-going pockets perpendicular to each other; a housing enclosing the rotor and having first, second, third and fourth ports equally spaced around the periphery thereof for registry with inlets and outlets to and from the through-going pockets; and at least one screen associated with the housing and rotor for allowing passage of liquid and fine particles therethrough, but preventing passage of particles larger than a predetermined size therethrough;
a low pressure feed line attached to the housing first port;
a low pressure discharge line attached to the housing third port, which is opposite the first port;
a high pressure feed line attached to the housing second port, which is between the first and third ports;
a high pressure discharge line attached to the housing fourth port, which is opposite the second port;
a low pressure pump disposed in said low pressure discharge line; and
a high pressure pump connected to the high pressure feed line; wherein the improvement comprises:
means for withdrawing a portion of the liquid, while under pressure, from the high pressure discharge line so that the solids concentration in the high pressure discharge line is increased; and means for returning liquid withdrawn from the high pressure discharge line to the high pressure feed line between the high pressure pump and the high pressure transfer device, said means including a boosting pump for boosting the pressure of said returning liquid so that it corresponds generally to the pressure of the liquid in the high pressure feed line.

15. Apparatus as recited in claim 14 wherein said liquid withdrawal means comprises an in-line screen in the high pressure discharge line, having an inner tube with peripherally extending slots therein, and a liquid outlet extending from a peripheral area between the inner tube and a solid outer tube.

16. Apparatus as recited in claim 14 wherein said liquid withdrawal means comprises a settling tank and a liquid outlet extending from the top portion of the settling tank.

17. Apparatus as recited in claim 14 wherein said liquid withdrawal means comprises a hydrocyclone and a liquid outlet extending from the top portion thereof.

18. Apparatus as recited in claims 15, 16, or 17 wherein said liquid return means further including a return line leading from said boosting pump back to said high pressure feed line, and a throttling valve disposed in said return line.

19. Apparatus as recited in claim 18 further comprising a gamma radiation absorption device disposed downstream of said withdrawal means in said high pressure discharge line for automatically determining the solids concentration of slurry flowing in said high pressure discharge line; and means responsive to said gamma radiation absorption device for automatically controlling said valve to thereby control the amount of liquid withdrawn by said withdrawal means, and thus the concentration of solids in said discharge line.

20. Apparatus as recited in claim 14 further comprising means for removing fine particles from the liquid in the low pressure discharge line; and means for returning liquid after fine particles removal to the low pressure feed line.

21. Apparatus as recited in claim 20 wherein said means for removing fine particles from the liquid in the low pressure discharge line comprises a screen assembly located vertically above the high pressure transfer device in the low pressure feed line, said screen assembly including a housing having an inlet vertically above an outlet, and having a slanting screen disposed between the inlet and outlet.

22. Apparatus as recited in claim 21 wherein said slanting screen has openings therein approximately 0.25 mm in size.

23. Apparatus as recited in claim 21 wherein said low pressure feed line comprises a hopper; said apparatus further comprising means for controlling the level of liquid in the hopper, said level control means consisting of a stepped overflow pipe arrangement extending from an upper portion of the hopper, below the top of the hopper.

24. Apparatus as recited in claim 23 further comprising a vertical screen extending in said hopper adjacent said overflow pipe arrangement, said screen having relatively large openings formed therein.

25. Apparatus as recited in claims 20 or 23 wherein said high pressure transfer device at least one screen comprises a mid-screen disposed in the central portion of each of said rotor pockets.

* * * * *